Patented June 12, 1928.

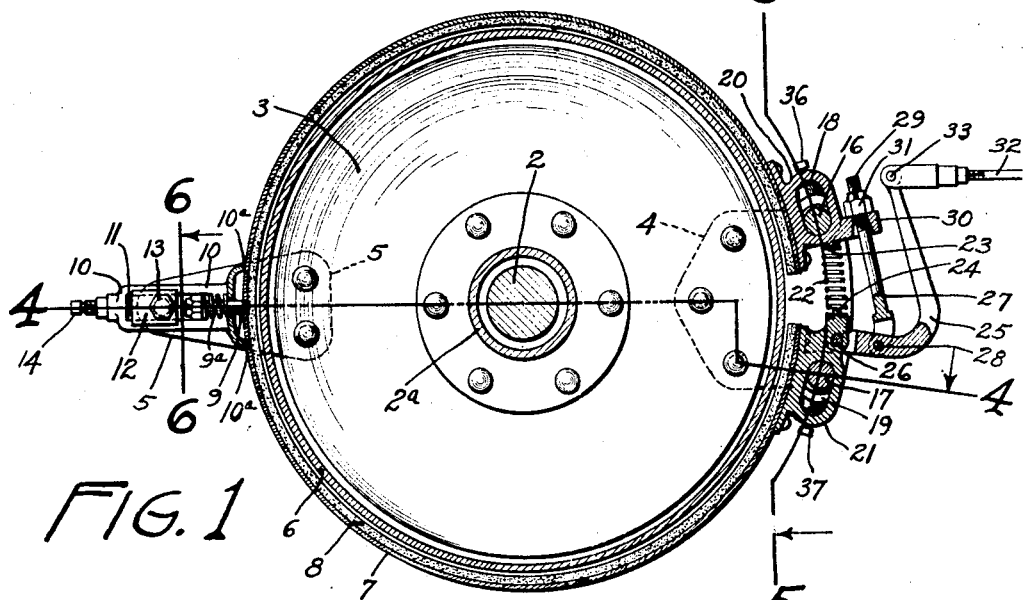

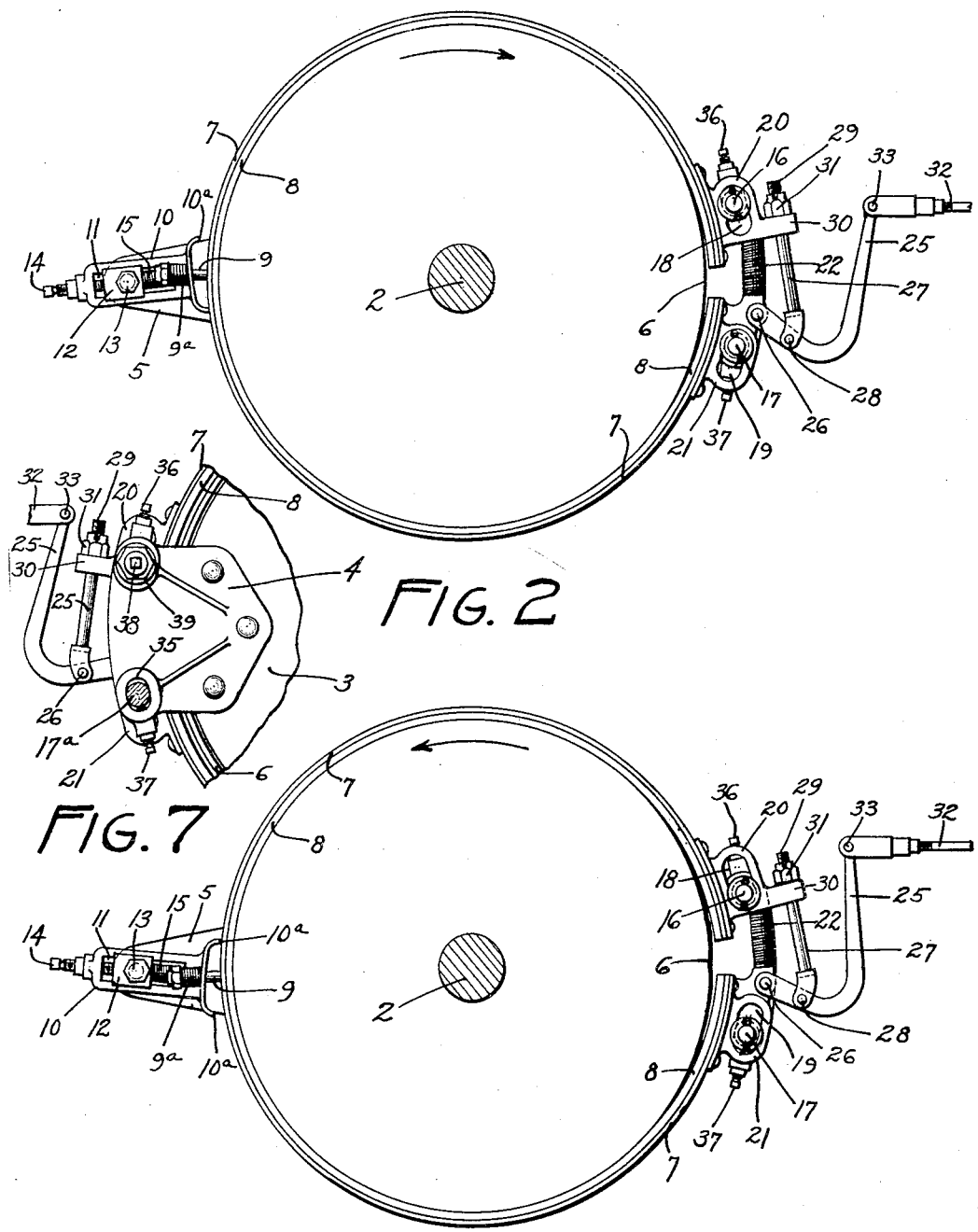

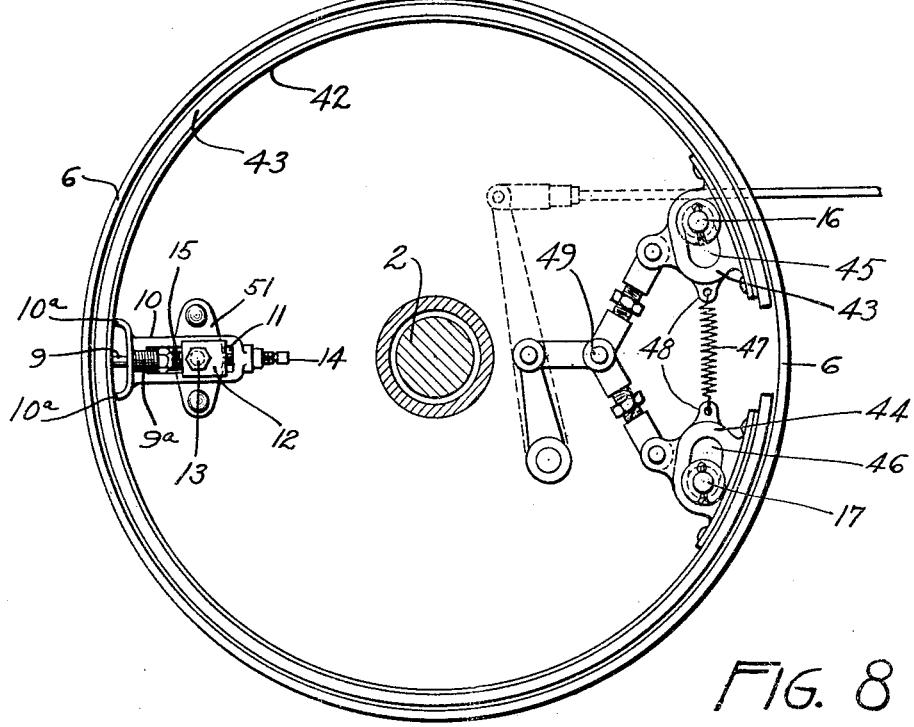
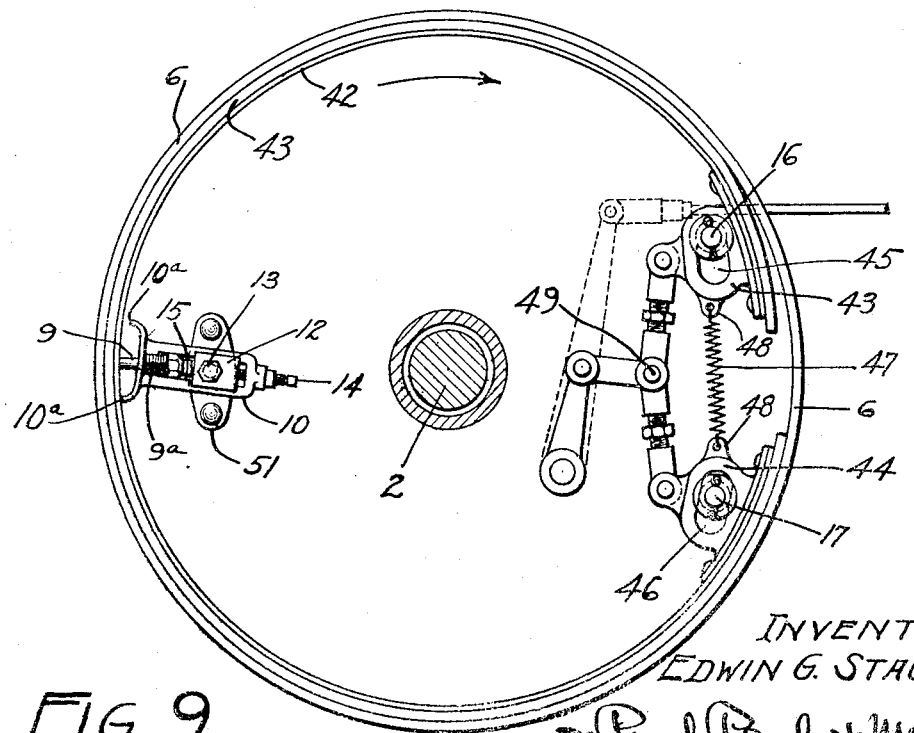

1,673,211

UNITED STATES PATENT OFFICE.

EDWIN GUSTAVE STAUDE, OF MINNEAPOLIS, MINNESOTA.

FRICTION BRAKE.

Application filed October 8, 1923. Serial No. 667,301.

This invention relates to improvements in friction brakes and more particularly relates to improvements in such brakes as are commonly used in connection with power driven vehicles.

The particular object of my invention is to provide a simple and inexpensive brake which will utilize substantially the "full wrap" effect of the brake element to retard the movement of the vehicle in either direction of movement.

A further object is to provide an improved vehicle brake which shall utilize the action of the friction between the brake element and the drum to assist in setting the brake, means being provided for taking up the slack thereof, so that the same will be easier to operate through the controlling linkage.
A further object is to provide a vehicle brake so constructed as to engage simultaneously, when actuated, substantially the entire peripheral friction surface of the brake drum in either direction of movement, thereby greatly reducing the amount of pressure required to effect a given frictional resistance, as compared to that usually required in brakes of ordinary construction.

A further object is to provide a brake having an improved brake-band or element so designed that the entire length thereof will engage the complementary friction surface of the brake drum, when actuated, thereby distributing the wear over its entire frictional surface and therefore greatly prolonging the life of the brake as well as increasing the effectiveness and efficiency thereof.

Brakes now in use generally have their brake elements or bands anchored at the middle thereof so that the braking effect on the drum will be equal in either direction of movement, thereby also causing the pulling force exerted at the ends of the bands in setting the brake, to be equal. In order to provide for reverse action of the drum when it rotates in the direction shown in Figure 2 of the drawings, the tension of the upper half of the band, or expanding shoe, will increase from the point where the pull or push is applied to the anchored point, while the tension in the lower half of the same will decrease. Some brakes are now designed to increase the arc of frictional contact of the brake element and drum when the car is traveling forward, on the theory that the brake is much more frequently used in the forward direction than in backing up, but by increasing the arc of contact for forward action, the efficiency of the brake for backing up is correspondingly reduced. It is, therefore, the purpose of my invention to provide a brake which will have the brake element substantially in full contact with the drum, when applying the brake, regardless of direction of rotation.

Designers of motor car brakes attach a great deal of importance to the fact that with a band brake a "wrapping-on" is obtained, which increases the retardation for a certain brake rod pull. If a rope or band is wrapped around a brake drum, having one of its ends securely anchored to some fixed part, and a pull is exerted on the other end thereof, owing to the friction between the band and drum, the tension on the rope will be gradually increased or decreased from the end at which the pull is applied to the fixed end, according to whether the pull and the rotation of the drum are in the same direction or opposite. It is well known, however, that a brake to be practical and efficient, must hold for backward as well as for forward movement of the wheels. In the past this principle of brake construction has only been used where it was found desirable to get a braking action in one direction only, relying on some other braking appliance to provide the braking action for rotation of the brake drum in the opposite direction. Brakes which act only in one direction are usually called "single acting" and have very little holding power for reverse motion.

Attempts have been made to overcome this defect by anchoring the brake element at a point an equal distance from each end of the brake mechanism, in order that the frictional contact between the brake element and the brake drum would be equal for both forward and rearward movement of the vehicle. With the ordinary band brake, as now in use an anchored in the center of the brake band to provide equal frictional contact on the drum for rotation in either direction, the friction of the top half, assuming the drum to be rotating in the direction shown in Figure 2, is equal to approximately 1.375 times the pull exerted on the free end thereof, and the friction between the bottom half and the drum equals approximately 0.578 110 times the pull on the free end of the band. The total friction between the band and drum, therefore, is equal to the sum of these two, or 1.953 times the pull on either free end. This friction is the same, whether the drum is revolving forward or backward, because in either case half of the band tends to wrap and the other half tends to unwrap. If the bands were anchored at one end, as I now propose in my invention, and extended over an angle arc of circumference, say 330 degrees, then the tension of the fixed end would be 5.64 times as great as at the free end, and the frictional force 4.464 times as great as the pull on the free end. If, however, I made no provision for reversing the fixed ends, then for the reverse motion the tension at the fixed end would be only 0.177 times as great as the tension at the free end, and the frictional force would be equal to 0.823 times the pull on the free end. Hence, such a brake would be 5.64 times as efficient in checking forward movement than it would be in checking backward motion.

With my invention, however, as soon as the backward motion occurs, the fixed points change automatically, so that I have thereby the "full wrap-on" effect, regardless of whether the brake drum travels in the forward or reverse direction.

Briefly, I find that with the wrapping portion equal to only three-fourths of the whole length of the band that the friction, and hence the braking effect, is increased by 54% for the forward motion on the car and decreased about 38% for reverse motion, as compared with a brake of present standard construction, having the anchor at the middle of the band and therefore equal wrapping and unwrapping portions.

With my construction, I am able to get a much greater contact than three-fourths of the length of the band; in fact, I can easily get approximately 330 degrees contact, because the only distance that I am unable to cover is the small opening required for attaching the operating connections to permit the proper function for adjusting and setting the brake.

In the accompanying drawings forming part of this specification.

Figure 1 is a vertical sectional view on the line 1—1 of Figure 4, through a drum and axle of a motor car of ordinary construction, showing my improved brake applied thereto and in neutral position;

Figure 2 is a view showing the position of my improved brake set with the drum traveling in a forward direction, as indicated by the arrow;

Figure 3 is a similar view, showing my improved brake set and the drum rotation in a reverse direction as when backing up;

Figure 4 is a horizontal sectional view on the line 4—4 of Figure 1;

Figure 5 is an enlarged detail sectional view on the line 5—5 of Figure 1, showing the means provided for relatively adjusting the anchor pins with reference to the periphery of the drum;

Figure 6 is a detail sectional view on the line 6—6 of Figure 1;

Figure 7 is a detail view, partially in section, showing the anchor pins provided for securing the ends of the brake bands;

Figure 8 is a view showing my invention applied to an internal brake, the parts being shown in neutral position; and Figure 9 is a similar view showing the parts in braking position with the drum traveling in the direction shown by the arrow.

In the drawings, 2 represents an ordinary rear axle of a motor car mounted in the usual housing $2^a$ to which the usual spider 3 is secured. Supporting brackets 4 and 5 are secured to the spider 3, adapted to support my improved brake and operating mechanism, as hereinafter set forth. 6 represents the usual drum attached to the motor car wheel in the usual manner, and mounted over the outer surface of this drum I provide the usual brake band 7, lined with the usual friction material 8. Means are provided to normally hold the brake band out of frictional contact with the periphery of the brake drum 6 when the parts are in inoperative or neutral position, as shown in Figure 1. Such means consists preferably in securing a stud 9 to the central portion of the band 7 at a point an equal distance from each end thereof. This stud projects outwardly therefrom through an aperture provided in a bracket 10 and has a compression spring $9^a$ mounted thereon adapted to yieldably hold the band against the inwardly curved terminal ends $10^a$ of the bracket 10, as shown in Figures 1, 2 and 3. The bracket 10 preferably has an elongated aperture or slot 11 provided therein, adapted to receive a flanged block 12 which is pivotally mounted upon a shouldered stud 13 suitably secured to the outer end portion of the bracket 5. An adjusting screw 14 is terminally mounted in the outer end of the bracket 10, and preferably has its inner reduced end portion $14^a$ inserted in a socket provided in the outer end of the flanged block 12, as clearly shown in Figure 1. A suitable compression spring 15 is interposed between the inner end of the block 12 and the adjacent end of the slot 11, thereby tending to inwardly move the slotted bracket 10, which, however, is prevented from inward movement by the adjusting screw 14, being in engagement with the block 12. Thus, it will readily be seen, that normally the screw 14 will be yieldingly held against the block 12 by the action of the spring 15. The purpose of the above described mechanism is to provide means for positively centering the band 7 with reference to the axis of the axle 2, in order to prevent the brake-lining 8 from contacting with the brake drum, when the brake is not functioning. As particularly shown in Figures 2 and 3, as soon as the brake is set, the slotted bracket 10 will oscillate on the pivot pin 13 in the direction in which the brake drum is rotating, caused by the stud 9 of the brake band 7 being in engagement therewith. As the bracket 10 thus oscillates upon its center, it will simultaneously be moved outwardly against the compression of the spring 15, as a result of one of the inwardly turned terminal ends 10$^a$ thereof, being in engagement with the outer surface of the brake band 7, as shown. Simultaneously, the spring 9$^a$ will similarly be compressed as a result of the stud 9 being drawn closer to the axis of the brake drum, and at the same time slightly rotating thereon as the band engages the periphery of the drum. When the bracket 10 is thus positioned, as shown in either Figures 2 or 3, it will have a tendency to restore the band to its normal or neutral position, out of engagement with the brake drum, as shown in Figure 1. Therefore, as soon as the brake band is released, it will immediately be returned to normal position, and retained in such position until the band is again actuated. In the drawings, I have shown only one bracket 10 and its complementary parts for holding the brake lining out of engagement with the brake drum. It is to be understood, however, that more than one such bracket and parts may be employed if desired.

The means provided for anchoring the brake band consists preferably in the provision of a pair of anchor pins 16 and 17, adjustably mounted in the bracket 4. These anchor pins are adapted to operate in opposed slots 18 and 19, formed in suitable brackets 20 and 21, which are secured to the ends of the brake band by suitable rivets in the usual manner. In order to keep the brake band 7 expanded so that the lining 8 will be out of engagement with the drum when not in action, I preferably provide a suitable compression spring 22 between the adjacent ends of the slotted brackets 20 and 21, fitted thereto by means of raised bosses 23 and 24, respectively, as shown in Figure 1. This spring tends to force the brackets 20 and 21 apart into neutral position, being limited from further outward movement by means of the anchor pins 16 and 17 engaging the adjacent ends of the opposed slots 18 and 19. When thus positioned, the brake band will be expanded and the lining 8 will be out of frictional contact with the brake drum.

A forked operating lever 25, of usual form, is pivotally connected to the bracket 21 by means of a pivot pin 26, and the lower forked end of a suitable adjusting bolt 27 is similarly connected to the operating lever 25, adjacent the pivot pin 26, by means of a pin 28. The upper end portion 29 of the bolt 27 passes through a lug 30, preferably integrally formed on the bracket 20, and has a nut 31 in threaded engagement therewith by means of which the brake band may be adjusted, in the usual manner, to compensate for wear, etc. The hole in the lug 30 is preferably larger than the diameter of the bolt 27, so as to allow the bolt free movement therein and to avoid binding, when actuating the brake. The usual brake rod 32 has one end pivotally connected to the upper terminal end of the operating lever 25 by means of a pin 33, and has its other end connected to the usual foot-pedal or other operating means, not shown. As the brake band material 8 wears, adjustment may be made by tightening up on the nut 31, so as to permit the maximum expanded position of the band to be reduced to the minimum required in order to eliminate any unnecessary lost motion. When the nut 31 is adjusted after the brake band material 8 wears down, it will follow then that the pins 16 and 17 will not entirely move to the bottom of the slots 18 and 19 when in the neutral position. Referring to Figure 5 and Figure 7, the pins 16 and 17 are preferably adjusted to their proper position in the casting 4 by means of slots 34 and 35 provided therein, and in which the pins are mounted, and since the action of the spring 22 tends to force the pins outward, the adjustment is made permanent by set screws 36 and 37. In order to radially adjust the pins 16 and 17 with reference to the brake drum, the inner portions 16$^a$ and 17$^a$ thereof are offset or made eccentric as shown in Figure 5, and their ends are preferably squared, as shown at 38, to receive a wrench, so that the anchor pins may be turned to adjust them to the proper position before tightening the lock nuts 39 in threaded engagement therewith. Suitable washers 41 are placed under the lock nuts 39 to cover the slot openings 34 and 35 through which the pins pass.

From the above description, it is clear that great accuracy in the machining and location of the slots in the casting 4 is not required, since the exact position of the pins may be readily obtained when the final adjustment is made.

In practice, it is desirable that the pins 16 and 17 will normally engage the bottoms of the slots 18 and 19 in order to hold the brake mechanism secure and keep the same from rattling.

In the operation of this novel brake it will be noted that when the direction of rotation is in the direction of the arrow, shown in Figure 2, the pin 17 becomes the fixed point and when thus positioned, the brake band material 8 is not in contact with the drum at the point immediately below the pin. As soon as the operating lever 25 is actuated the band, the material with which it is lined, being flexible, will oscillate around the pin 17 and work itself into "wrapping-on" contact substantially below the pin and continue this effect entirely around the drum to a point beneath the pin 16. By pulling on the lever 25 with the drum rotating in the direction of the arrow (shown in Figure 2) the spring 22 will be compressed and the slotted bracket 20 moved towards the slotted bracket 21, this being permitted through the slot 18 in the bracket 20.

As soon as the lever 25 is released the brake lining 8 will immediately be returned to normal position by the action of the spring 22 and the pivotally and yieldably mounted bracket 10, thereby always retaining the necessary space between the lining 8 and drum when in neutral position. The same action takes place when the drum rotates in the reverse direction, as shown in Figure 3, except that the pin 16 in the slot 18 becomes the fixed point, since the drum now revolves in the opposite direction and the other functions take place through the action of the movement of the pin 17, in the slot 19, in a manner similar to that described with reference to Figure 2.

From the above description, it can readily be seen and understood that I obtain the "full wrap" effect almost entirely around the drum, regardless of the direction in which the drum rotates. I further have positive means for pulling the band out of contact with the drum without complicated mechanism, and further provide for only one general means of adjustment, thereby greatly simplifying the construction thereof, as compared to brakes in ordinary use which require separate adjustment for each half of the band brake. Also by the employment of this novel brake band featured in this invention, the usual objectional chattering and squeaking, often present in brakes of ordinary construction, will be entirely eliminated, thereby providing a very quiet and effective operating brake.

In Figures 8 and 9 I have shown the invention applied to an internal brake, comprising the usual brake band or shoe 42 to which the usual brake lining 43 is suitably secured and adapted to engage the inner friction surface of the drum 6. Brackets 43 and 44 are similarly secured to each end of the brake element 42 and are provided with elongated slots 45 and 46 which are preferably arranged at a slight angle with reference to a radial line drawn through the axis of the axle 2. The anchor pins 16 and 17 pass through these slots and function to anchor one end of the band when the brake is actuated depending upon the direction of movement, in a manner similar to that shown and described with reference to the previous figures. The purpose of arranging the slots 45 and 46 in the brackets 43 and 44, at an incline, as shown is to cause the free or movable end of the band, directly beneath its complementary anchor pin, to be moved inwardly into frictional contact with the periphery of the brake drum. This frictional contact with the drum at this point will further assist in setting the brake, thereby reducing the necessary pull exerted on the operating mechanism 49 to actuate the brake, and is, therefore, an important feature of this invention.

In applying the invention to an internal brake as above described, the action of the band or brake element, will, of course, be reversed to that shown and described with reference to Figures 1 to 7, inclusive. Instead of the compression spring 22 I provide a tension spring 47 between the slotted brackets 43 and 44, which functions to normally hold the brake lining 8 out of engagement with the brake drum as shown in Figure 8. This spring is preferably connected to the brackets by means of integral lugs or ears 48. The usual operating mechanism or linkage 49 is provided and connected to the slotted brackets 43 and 44, as shown, by means of which the band may be expanded when it is desired to actuate or set the brake.

The means provided for normally holding the brake lining 8 out of engagement with the brake drum when the brake is out of use or in normal position, as shown in Figure 8, consists in pivotally mounting the bracket 10 upon a stationary bracket 51 secured to the spider 3, so that it will function to normally hold the lining 8 out of engagement with the drum in a manner similar, to that shown and described with reference to the previous figures.

I do not wish it to be understood that I am limiting myself to the precise construction shown, since I believe the principle of the "full wrap" or "nearly full wrap" in either direction to be new, as well as the action of the drum in assisting the setting of the brake, both of which may be done in various ways. I also do not wish it to be understood that I am confining my invention to the linkage action shown, because obviously I must provide a different linkage should I desire to use this brake for the front wheels of a motor car, where the control would have to take into account the necessity for the pivoting action of the wheel.

I do not want to confine myself to the precise method of adjusting the brake band shown, since I can just as readily provide an adjustment on one of the brackets 20 or 21, adjusting same towards or from the end of the band 7 and thereby always secure the position of the pins 16 and 17 at the bottom of the slots 19 and 20, and adjust the nut 31 to give the correct position of the lever 26 with reference to the brake rod.

I claim as my invention:

1. A motor vehicle brake having a friction surface, a co-acting friction member having a suitable operating mechanism, adjustable stops operating in slots provided at each end of said co-acting friction member, and a pivoted bracket having a yielding connection with said co-acting friction member and adapted to hold it out of contact with said friction surface during the inactive period, said bracket connection being independent of the friction member operating mechanism 2. A brake mechanism comprising a drum, a supporting plate, a brake member pivoted thereon, actuating mechanism for said brake member, and a brake member releasing mechanism comprising a rocking element for releasing the brake member, both as to rotary and radial position, upon the release of the brake actuating mechanism.

3. A brake mechanism comprising a drum, a supporting plate, a brake band pivoted thereon, actuating mechanism for said brake band, and a brake band releasing mechanism comprising a rocking member held in yielding contact with the brake band in both the set and released positions of the brake band.

4. A brake mechanism comprising a drum, a supporting plate, a brake member pivoted thereon, an actuating mechanism for said brake member, an anchor for said brake member, and a yielding rocking mechanism for returning the brake member to its inactive position, both as to rotary and radial movement upon release of the brake member.

5. In a brake mechanism comprising a drum, a brake member anchored at one end in operative relation to the drum, and mechanism for actuating the brake member; means for returning the brake member, both radially and rotatively, to its inactive position, said means comprising an oscillating bracket operatively connected with the brake member, and means for exerting spring tension on the brake member through the bracket for restoring the brake member radially and rotatively to normally released position.

6. A brake mechanism comprising a drum, a brake member pivotally supported in relation thereto, actuating mechanism for the brake member, and a brake member releasing mechanism including a rocking element connected with the brake member and exerting a radial as well as rotative pressure thereon in returning the brake member to inactive position.

In witness whereof, I have hereunto set my hand this 6th day of October, 1923.

EDWIN GUSTAVE STAUDE.